(12) United States Patent
Ke et al.

(10) Patent No.: US 10,843,539 B2
(45) Date of Patent: Nov. 24, 2020

(54) TENSIONER APPARATUS FOR USE WITH VEHICLE SUNROOFS

(71) Applicant: AISIN TECHNICAL CENTER OF AMERICA, INC., Northville, MI (US)

(72) Inventors: Chanli Ke, Northville, MI (US); Jacob Grimaldo, Northville, MI (US); Michael Mixon, Northville, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 7 days.

(21) Appl. No.: 16/358,992

(22) Filed: Mar. 20, 2019

(65) Prior Publication Data

US 2020/0298682 A1    Sep. 24, 2020

(51) Int. Cl.
| | |
|---|---|
| *B60J 3/02* | (2006.01) |
| *B60J 7/00* | (2006.01) |
| *B60J 7/043* | (2006.01) |
| *B60J 1/20* | (2006.01) |

(52) U.S. Cl.
CPC .......... *B60J 7/0015* (2013.01); *B60J 1/2011* (2013.01); *B60J 7/0084* (2013.01); *B60J 7/043* (2013.01)

(58) Field of Classification Search
CPC .......................... B60J 7/0084; B60J 7/70015
USPC .................................................. 296/213, 214
See application file for complete search history.

(56) References Cited

U.S. PATENT DOCUMENTS

| | | |
|---|---|---|
| 6,491,340 B2 | 12/2002 | Hori et al. |
| 7,156,143 B2 | 1/2007 | Katada et al. |
| 8,777,302 B2 | 7/2014 | Kanai et al. |
| 9,387,748 B2 | 7/2016 | Sawada |
| 2017/0008383 A1 | 1/2017 | Ten-Jet-Foei |

FOREIGN PATENT DOCUMENTS

| | | |
|---|---|---|
| DE | 197 46 543 A1 | 5/1999 |
| DE | 10 2014 005 476 A1 | 10/2015 |
| WO | WO 2007/068217 A1 | 6/2007 |
| WO | WO 2018/114147 A1 | 6/2018 |

*Primary Examiner* — Dennis H Pedder
(74) *Attorney, Agent, or Firm* — Oblon, McClelland, Maier & Neustadt, L.L.P.

(57) ABSTRACT

Tensioner apparatus for use with vehicle sunroofs are disclosed. A disclosed assembly for a vehicle sunroof includes a sunshade tensioner defining a body that is configured to engage a sunshade of the vehicle sunroof to prevent the sunshade from wrinkling. The assembly also includes a first tab supported by a first component of the vehicle sunroof. The first tab is configured to extend through a first aperture positioned on the body to removably couple a first end of the body to the first support component.

12 Claims, 7 Drawing Sheets

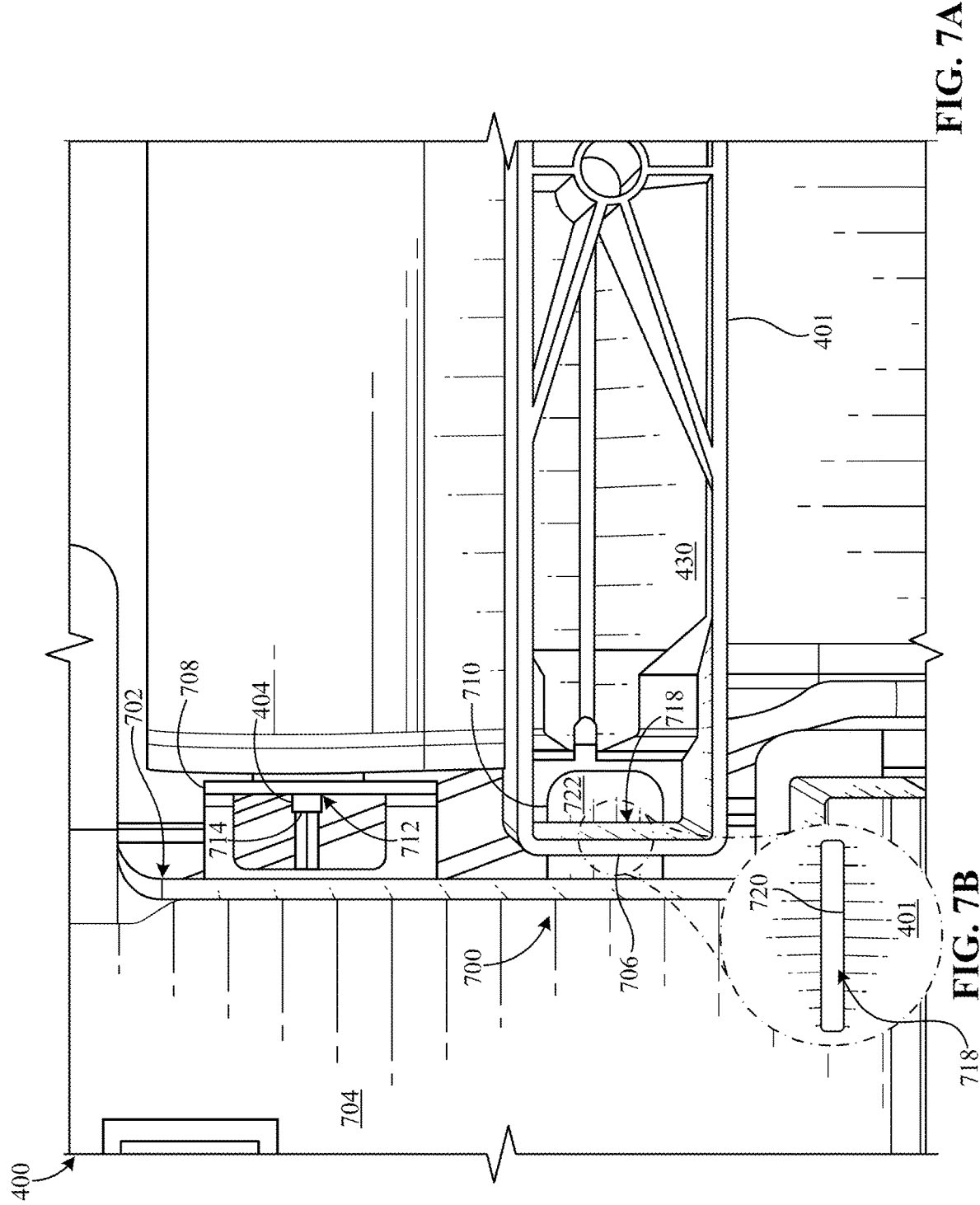

TENSIONER APPARATUS FOR USE WITH VEHICLE SUNROOFS

FIELD OF THE DISCLOSURE

This disclosure relates generally to vehicles and, more particularly, to tensioner apparatus for use with vehicle sunroofs.

BACKGROUND

Vehicle sunroofs typically employ sunshade axles and sunshade tensioners to facilitate operation of a sunshade. For example, a sunshade of a sunroof may be positioned on a sunshade axle such that a vehicle occupant can wind the sunshade on the sunshade axle and unwind the sunshade to cover a sunroof panel. Further, a sunshade tensioner is configured to apply a force or pressure on the sunshade to prevent the sunshade from wrinkling, which may be desirable to the vehicle occupant. In this manner, such sunshade axles and tensioners improve comfort of vehicle occupant during certain vehicle lighting conditions. To ensure a sunshade functions properly, an associated sunshade axle and sunshade tensioner need to be properly positioned relative to each other and/or secured in place.

SUMMARY

An example assembly for a vehicle sunroof includes a sunshade tensioner defining a body that is configured to engage a sunshade of the vehicle sunroof to prevent the sunshade from wrinkling. The assembly also includes a tab supported by a first component of the vehicle sunroof. The tab is configured to extend through a first aperture positioned on the body to removably couple a first end of the body to the first support component.

An example vehicle sunroof includes a first sunroof drain configured to convey a fluid away from the vehicle sunroof. The vehicle sunroof also includes a sunshade tensioner configured to impart a pressure on a sunshade. The vehicle sunroof also includes a first fastening mechanism configured to couple a first end associated with the sunshade tensioner to the first sunroof drain and decouple the first end from the first sunroof drain.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7A is an enlarged partial-view of another example sunroof drain and shows another example fastening mechanism in accordance with the teachings of this disclosure; and FIG. 7B is an enlarged portion view of an example sunshade tensioner and shows an aperture thereof.

The figures are not to scale. In general, the same reference numbers will be used throughout the drawing(s) and accompanying written description to refer to the same or like parts.

DETAILED DESCRIPTION

Figure 1:
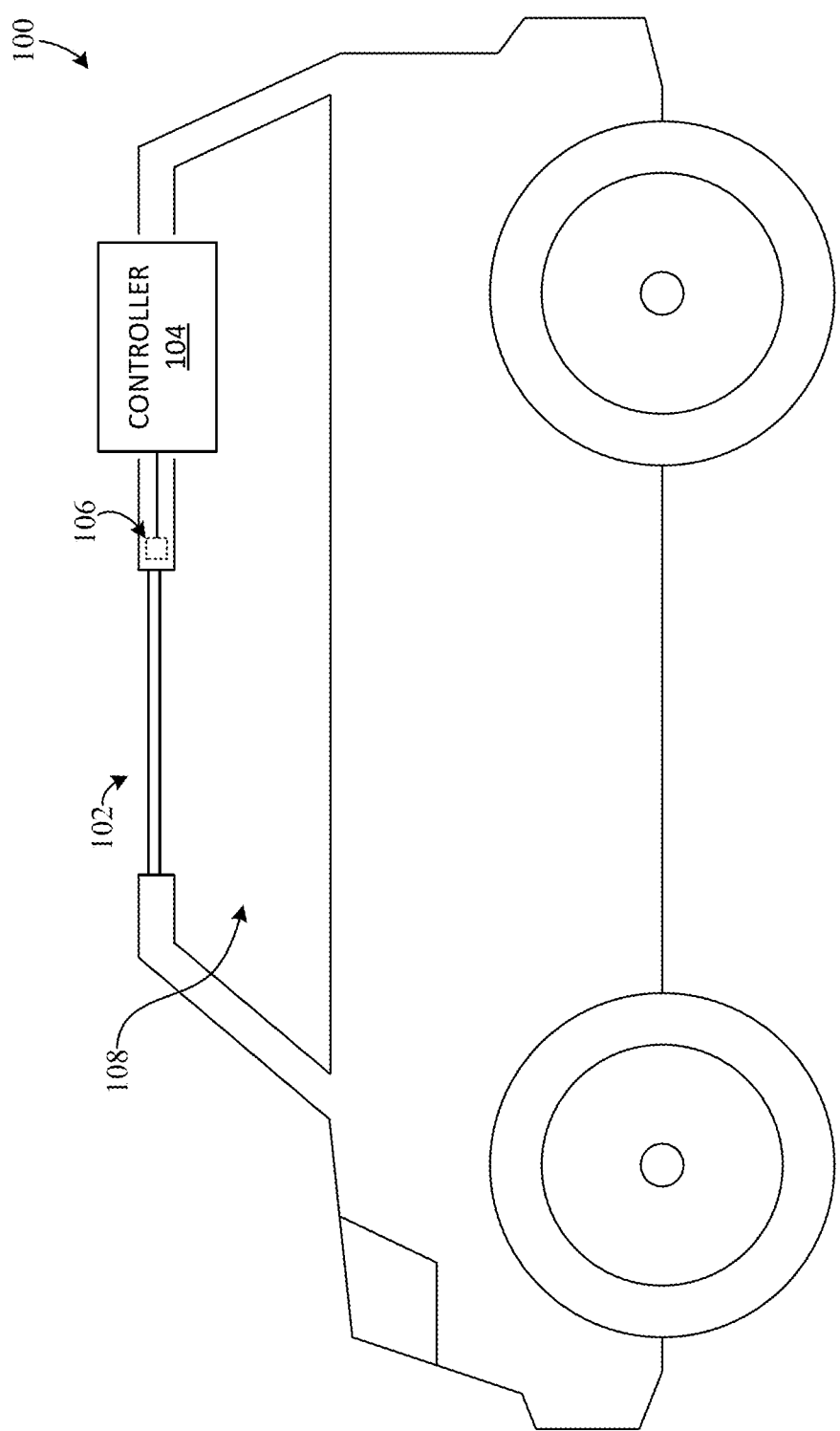
FIG. 1 is a view of an example vehicle in which examples disclosed herein can be implemented.

Some known vehicle sunroofs include known sunshade brackets that are configured to hold a sunshade axle and also act as a tensioner by applying pressure to a sunshade positioned on the sunshade axle. However, to sufficiently support the sunshade axle and/or the sunshade while maintaining a sufficient pressure applied to the sunshade, such known brackets are relatively large, heavy, and expensive to produce. These known sunroofs also typically have known drains that are separate from such known brackets and supported by a different sunroof component. In particular, these known sunroof drains are strictly configured to catch water and convey the water. That is, these known sunroof drains are not configured to hold a sunshade axle and/or a sunshade due to insufficient strength and/or rigidity of such known drains. Additionally, these known sunroofs also typically have rear housings that are mounted on and/or held by sunroof rails. Thus, these known vehicle sunroofs have multiple and/or separate coupling mechanisms to hold respective ones of a sunroof drain, a sunshade axle, a sunshade, a sunshade tensioner, and a sunroof housing. As a result of part complexity associated with these coupling mechanisms, such known vehicle sunroofs are expensive and/or time consuming to produce.

Further, to ensure proper sunshade functionality, some known sunshade tensioners typically need to be replaced, serviced, and/or maintained after they are installed into a sunroof. However, in order to access a known sunshade tensioner, substantially large sunroof components are often removed and/or disassembled first by vehicle servicer personnel, which incurs substantial costs.

Tensioner apparatus for use with vehicle sunroofs are disclosed. Examples disclosed herein provide an example sunshade tensioner for a vehicle sunroof. The disclosed sunshade tensioner defines an example body that is configured to impart a pressure on and/or otherwise engage a sunshade of the vehicle sunroof, thereby reducing, mitigating, and/or eliminating wrinkles that would have otherwise formed on the sunshade. The sunshade tensioner is coupled to (e.g., removably coupled) to a first example support component (e.g., one of a sunroof rail, a sunroof drain, etc.) of the vehicle sunroof such that the tensioner is positioned near a sunshade axle of the vehicle sunroof holding the sunshade. In particular, the sunshade tensioner is configured to decouple from the first support component after the tensioner is installed in the vehicle sunroof, for example, when the vehicle sunroof requires servicing and/or maintenance, as discussed in greater detail below in connection with FIGS. 4-6, 7A, and 7B.

Some disclosed example provide one or more example fastening mechanisms that are structured and/or configured to removably couple the sunshade tensioner to the vehicle sunroof when a user interacts with the fastening mechanism(s). In particular, a first disclosed fastening mechanism is configured to couple a first end of the tensioner body to the first support component of the sunroof and decouple the first end from the first support component. In some examples, the first fastening mechanism includes an example tab coupled to and/or supported by the first support component and extending away therefrom to receive the sunshade tensioner. Additionally, in such examples, the sunshade tensioner includes a first example aperture (e.g., a slot) positioned on the body at or near the first end that is sized, shaped, and/or otherwise configured to receive the tab. The disclosed tab is configured to extend through the first aperture, thereby removably coupling the first end of the tensioner body to the first support component. More particularly, when the tab is inserted into and/or positioned in the first aperture, the tab engages an inner surface of the tensioner body that forms and/or defines the first aperture, which substantially maintains a position and/or an orientation of the first end relative to the second support component. In such examples, the tab substantially holds the first end of the tensioner until a certain force is applied to the tensioner. For example, in response to a user urging the first end away from the first support component, the tab slides out of the first aperture such that the tensioner separates from the first support component and/or the tab. As a result, the user can easily assemble and disassemble the sunshade tensioner and the first support component via the first fastening mechanism.

Further, in some examples, a second disclosed fastening mechanism is configured to couple a second end of the sunshade tensioner, opposite the first end, to a second example support component (e.g., one of a sunroof rail, a sunroof drain, etc.) of the sunroof and decouple the second end from the second support component. In such examples, the second fastening mechanism includes a first example fastener (e.g., one of a bolt, a stud, a rivet, a screw, etc.) coupled to and/or supported by the second support component and configured to receive the second end of the tensioner. Additionally, in such examples, the sunshade tensioner includes a second example aperture (e.g., a circular opening) that is positioned on the tensioner body at or near the second end and sized, shaped, and/or otherwise configured to receive the first fastener. In particular, the first fastener is configured to extend through the second aperture, thereby removably coupling the second end of the tensioner to the second support component. Additionally, in such examples, the second fastening mechanism also includes a second example fastener (e.g., a threaded nut) positioned on the first fastener at or near an end thereof. The second fastener is adjustably coupled to the first fastener such that a user can interact (e.g., via a tool such as a wrench, a ratchet, etc.) with the second fastener to change a position of the second fastener relative to the first fastener. As such, the second fastener is movable relative to the first fastener to engage and/or disengage the tensioner body, which better maintains a position and/or an orientation of the second end relative to the second support component. As a result, the user can easily assemble and disassemble the sunshade tensioner and the second support component via the second fastening mechanism.

In this manner, disclosed examples enable user(s) to easily access and/or remove the sunshade tensioner without removing other component(s) of the vehicle sunroof, which would have otherwise been unattainable using the above-mentioned known sunshade tensioners and/or known vehicle sunroofs. As a result, disclosed examples reduce time and/or costs typically associated with replacing, servicing, and/or maintaining the sunshade tensioner and/or, more generally, the vehicle sunroof.

Additionally, some disclosed examples provide an example drain for the vehicle sunroof that is structured and/or configured to catch a fluid (e.g., water) and/or convey the fluid away from the sunroof (e.g., to an exterior of the vehicle), which prevents the sunroof from leaking. The drain is coupled to an example support component (e.g., a sunroof rail) of the vehicle sunroof such that the drain is sufficiently supported and/or secure. In particular, the disclosed drain is configured to couple (e.g., removably couple) to a sunshade axle (e.g., an axle having a sunshade positioned thereon) of the sunroof. In some such examples, the drain includes a first example adaptor (e.g., a first tab positioned on a drain body) that is coupled between and/or interposed between a body (e.g., a body defining a fluid cavity) of the drain and the sunshade axle to support and/or carry the sunshade axle. Additionally or alternatively, the disclosed drain is configured to couple (e.g., removably couple) to the sunshade tensioner associated with the sunshade axle. In some such examples, the drain includes a second example adaptor (e.g., a second tab positioned on the drain body) that is coupled between and/or interposed between the body and the sunshade to support and/or carry the sunshade tensioner.

Some disclosed examples provide an example drain bracket (e.g., sheet metal) coupled to the body of the drain (e.g., via one or more molding processes), which improves strength and/or rigidity of the drain to enable the drain to sufficiently support such sunroof component(s). In such examples, the drain bracket includes a first sheet portion (e.g., a sheet that is curved and/or angled) that is positioned in and/or extends through a portion (e.g., a central portion or area) of the drain body, thereby coupling the drain bracket to the drain body (e.g., the drain bracket and the drain body form a single-piece or integral component). In particular, the disclosed drain bracket is configured to hold one or more of the sunshade axle and/or the sunshade tensioner. In such examples, the drain bracket is shaped such that the drain bracket forms and/or defines one or more of the first disclosed adaptor and/or the second disclosed adaptor. Thus, the disclosed drain bracket is configured to hold one or more of the sunshade axle and/or the sunshade tensioner. In this manner, disclosed examples incorporate sunshade holding functionality and/or axle holding functionality into the drain such that the drain sufficiently holds such sunroof component(s), which would have otherwise been unattainable using the above-mentioned known sunroof drains. As a result, compared to the above-mentioned known sunroofs, disclosed examples reduce part complexity and/or costs typically associated with coupling such sunroof components together and/or providing sufficient support to the component(s).

FIG. 1 is a view of an example vehicle (e.g., a car, a van, a truck, a sport utility vehicle (SUV), etc.) 100 in which examples disclosed herein can be implemented. According to the illustrated example of FIG. 1, the vehicle 100 includes an example sunroof 102, an example controller 104, and one or more example motors 106. In particular, in some examples, the controller 104 is structured and/or configured to control the sunroof 102 to change a state of the sunroof 102, for example, via the motor(s) 106. In some examples, the controller 104 controls the sunroof 102 to open and/or close the sunroof 102. Additionally, in some examples, the controller 104 controls dimming functionality associated with the sunroof 102, for example, via one or more panels (e.g., electrochromic glass) of the sunroof 102.

The controller 104 of FIG. 1 can be implemented, for example, using one or more electronic control units (ECUs) operatively coupled to the vehicle 100. The controller 104 is sometimes referred to as a sunroof controller and/or a vehicle controller. In particular, the controller 104 is communicatively coupled to the sunroof 102 and/or the motor(s) 106, for example, via a transmission or signal wire, a bus (e.g., a control area network (CAN)), radio frequency, etc. In such examples, the controller 104 provides electrical power and/or one or more control signals or commands to the motor(s) 106, thereby controlling the motor(s) 106 and/or an output thereof (e.g., a torque and/or a force). Further, in some such examples, the controller 104 provides one or more of voltage, current, and/or electrical power to the panel(s) of the sunroof 102 and/or adjusts one or more of the voltage the current, and/or the electrical power, thereby changing a visual characteristic of the panel(s) of the sunroof 102. In this manner, the sunroof panel(s) affect (e.g., absorbs, reflects, scatters, and/or otherwise blocks) an external light (e.g., sunlight) that passes through the sunroof 102 and into a cabin 108 of the vehicle 100.

The sunroof 102 of FIG. 1 can be implemented, for example, using one or more of a panoramic sunroof, a pop-up sunroof, a sliding sunroof, a spoiler sunroof, a dimmable sunroof, etc. In particular, the sunroof 102 is structured and/or configured to open and/or close, for examples, in response to receiving the output of the motor(s) 106. As such, at least a portion (e.g., a sunroof panel) of the sunroof 102 is operatively coupled to the motor(s) 106 such that the motor(s) 106 can control movement associated with the portion of the sunroof 102.

The motor(s) 106 of FIG. 1 can be implemented, for example, using one or more electric motors. In particular, the motor(s) 106 are operatively coupled to the sunroof 102 to facilitate opening and/or closing the sunroof 102. For example, in response to receiving the power and/or the control signal(s) or command(s) from the controller 104, the motor(s) 106 cause the sunroof 102 to open and/or close.

Figure 2:
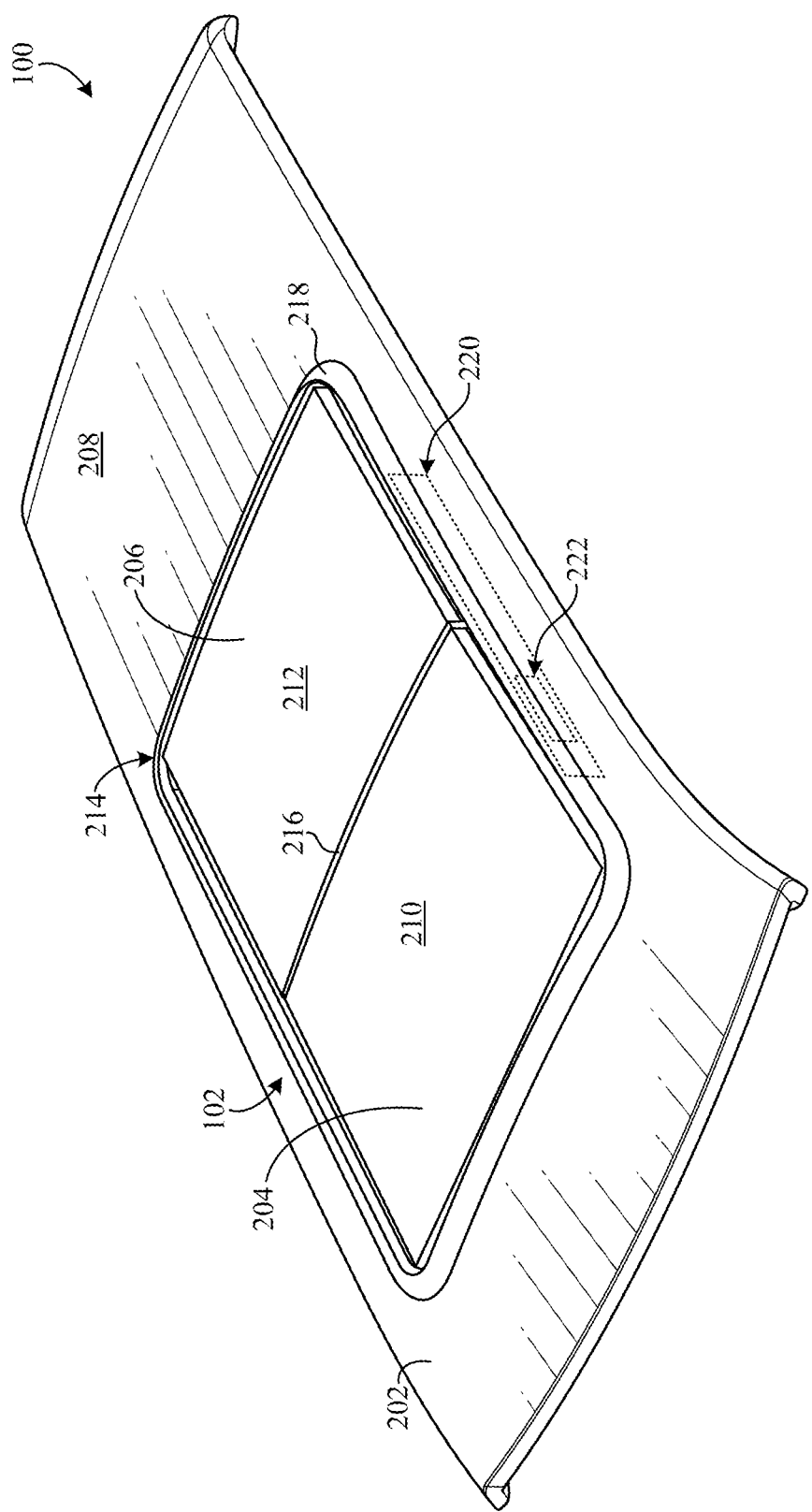
FIG. 2 is a partial-view of the example vehicle of FIG. 1 and shows and example sunroof in which examples disclosed herein can be implemented.

FIG. 2 is a partial-view of the vehicle 100 and shows the sunroof 102. As shown in FIG. 2, the sunroof 102 is positioned on and/or coupled to a roof 202 of the vehicle 100, for example, via one or more example fasteners and/or one or more example fastening methods or techniques. According to the illustrated example of FIG. 2, the sunroof 102 includes one or more example panels (e.g., glass) 204, 206, two of which are shown in this example (i.e., a first panel 204 and a second panel 206). As shown in FIG. 2, the sunroof 102 is in a closed state whereby the first panel 204 is in a first position (e.g., lowered position) thereof. When in the closed state, the sunroof 102 substantially isolates the vehicle cabin 108 from an outside environment. For example, the sunroof 102 and the vehicle roof 202 may form a fluid seal to prevent fluid(s) (e.g., air, water, etc.) and/or foreign matter from entering the vehicle cabin 108 when the sunroof 102 is in the closed state.

In some examples, the vehicle roof 202 and the first and second panels 204, 206 at least partially define an exterior surface 208 of the vehicle 100. As shown in FIG. 2, the first and second panels 204, 206 include respective first and second example surfaces (e.g., outer surfaces) 210, 212. In some examples, the first and second surfaces 210, 212 are substantially adjacent and/or parallel to each other when the sunroof 102 is in the closed state (i.e., when the first panel 204 is in the first position thereof). That is, the first and second surfaces 210, 212 substantially form a single plane and/or a substantially smooth or continuous surface when the first panel 204 is in the first position.

According to the illustrated example of FIG. 2, the vehicle roof 202 includes an example aperture 214 disposed on the exterior surface 208 within which the sunroof 102 is at least partially positioned. In some examples, to prevent the fluid(s) (e.g., air, water, etc.) and/or foreign matter from entering the vehicle cabin (e.g., via the aperture 214), the sunroof 102 includes one or more example sunroof seals (e.g., one or more trim seals) 216, 218, two of which are shown in this example (i.e., a first sunroof seal 216 and a second sunroof seal 218).

In particular, the first panel 204 of FIG. 2 is moveable from the first position to a second example position (e.g., a raised position and/or a tilted position) to provide the open state of the sunroof 102. In some examples, the sunroof 102 includes an example sunroof guide system 220 (as represented by dotted/dashed lines of FIG. 2) that is operatively coupled to the first panel 204 and structured and/or configured to guide movement of the first panel 204 between the first and second positions. In such examples, the sunroof guide system 220 includes and/or is otherwise implemented using, for example, any of one or more rails, one or more guide blocks, one or more brackets, etc., and/or any other appropriate sunroof component associated with guiding movement of the first panel 204 and/or supporting the first panel 204. Additionally, in some examples, the sunroof 102 also includes an example sunroof actuator system 222 (as represented by dotted/dashed lines of FIG. 2) that is operatively coupled to the first panel 204 and structured and/or configured to move the first panel 204 cooperatively with the guide system 220, for example, based on output from the motor(s) 106. In such examples, the sunroof actuator system 222 includes and/or is implemented using, for example, any of one or more moveable shoes, one or more rotatable links, etc., and/or any other appropriate sunroof component associated with controlling movement of the first panel 204. In particular, the motor(s) 106 are operatively coupled to at least a portion (e.g., a moveable shoe) of the actuator system 222, for example, via a cable, a belt, etc. that extends from the motor(s) 106 to the portion of the actuator system 222 and is configured to transfer the motor output therebetween.

Figure 3:
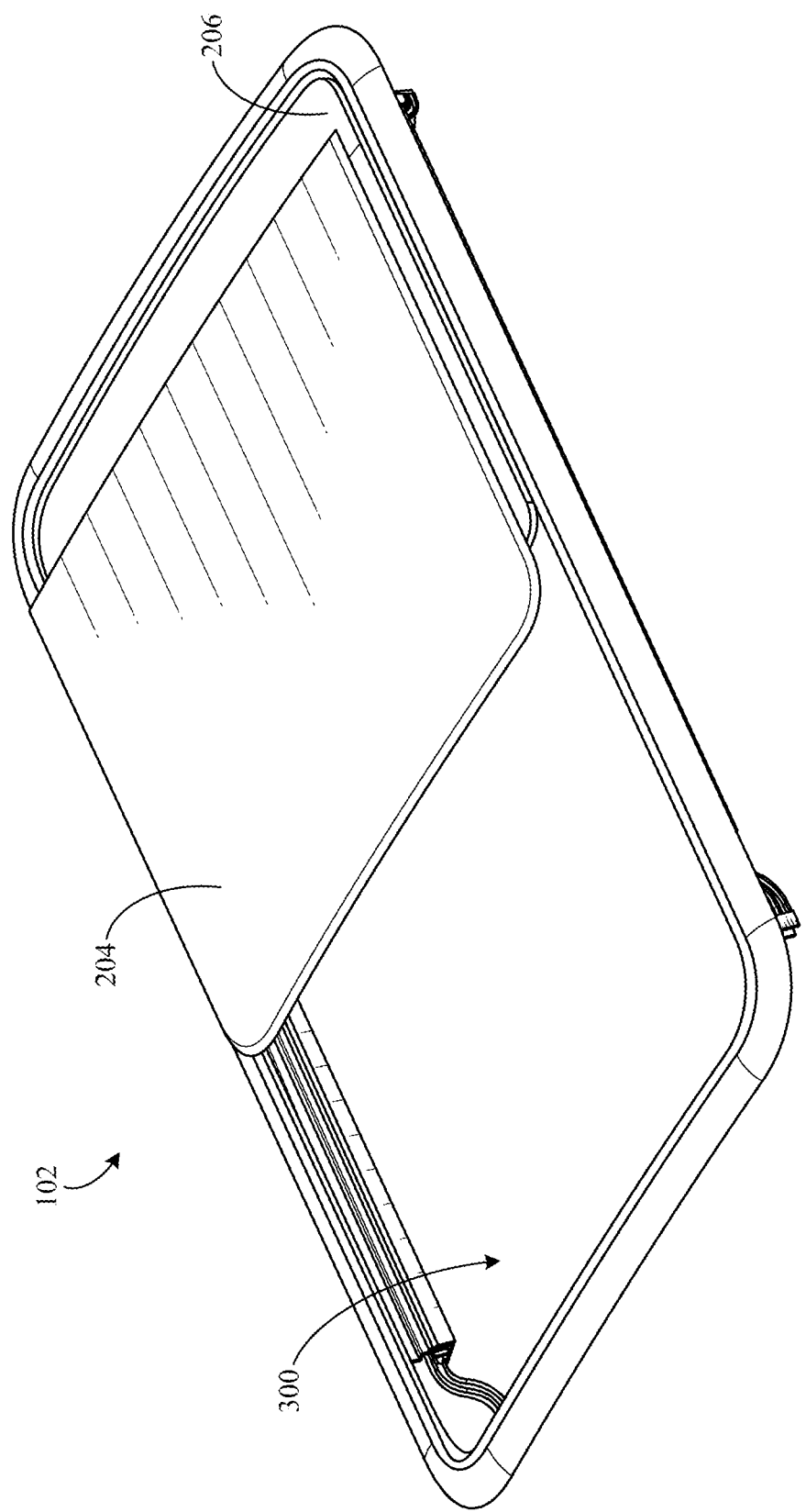
FIG. 3 is a view of the example sunroof of FIG. 2 in an example open state.

FIG. 3 is a view of the sunroof 102 in the open state. When in the open state, the sunroof 102 substantially exposes the vehicle cabin 108 to an outside environment. For example, the fluid(s) may pass into the vehicle cabin 108 through an example opening 300 associated with the sunroof 102 resulting from the first panel 204 moving away from the first position. In particular, the first panel 204 of FIG. 3 is in the second position. Although FIGS. 2 and 3 depict the first panel 204 as movable, in some examples, the second panel 206 is likewise movable to open and/or close the sunroof 102 in addition or alternatively to the first panel 204.

Figure 4:
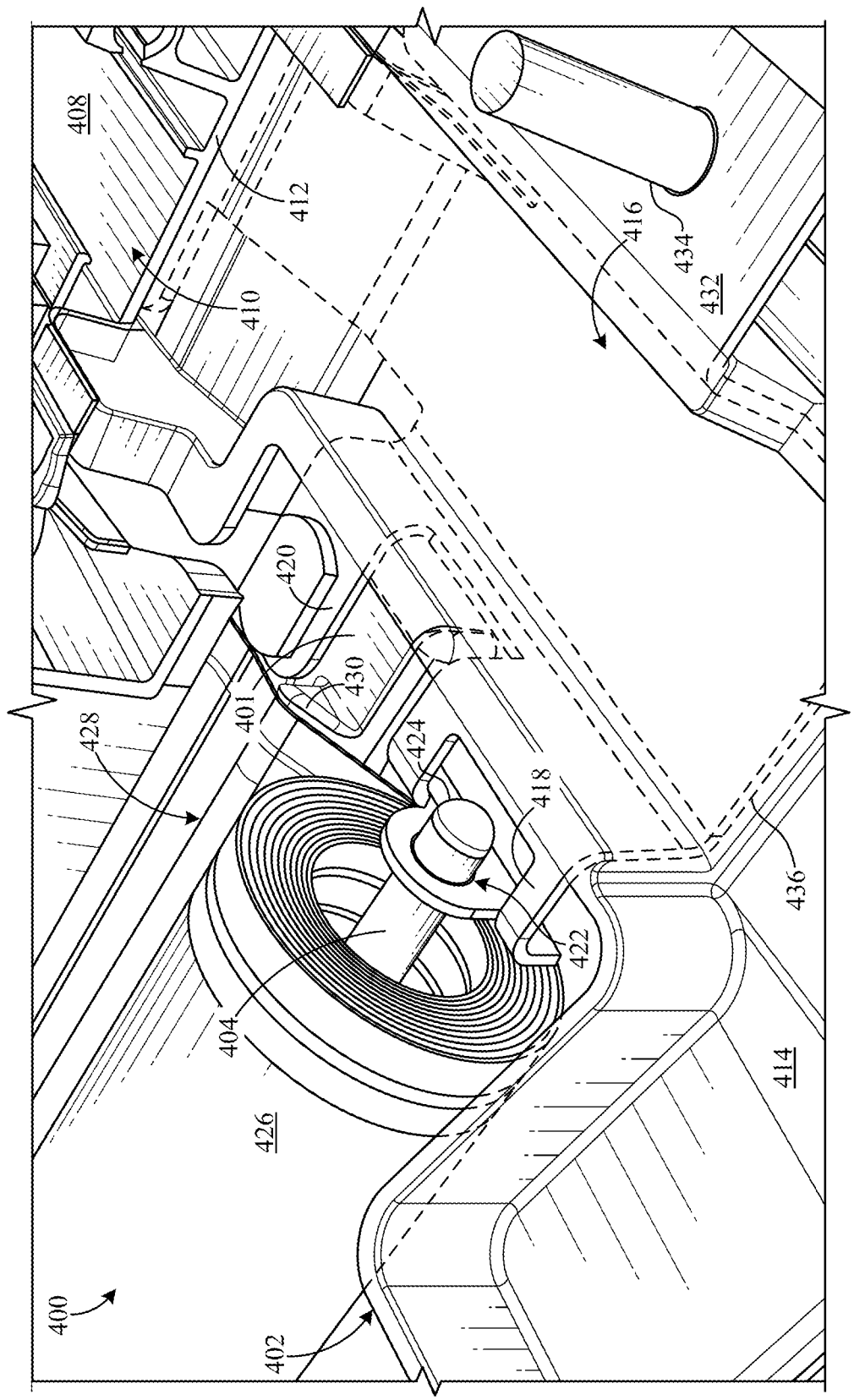
FIG. 4 is view an example assembly for a vehicle sunroof and shows an example sunshade tensioner in accordance with the teachings of this disclosure.

FIG. 4 is a view of an example assembly 400 for a vehicle sunroof and shows an example sunshade tensioner 401 in accordance with the teachings of this disclosure. In some examples, the assembly 400 of FIG. 4 is used to implement at least a portion of the sunroof 102 of FIGS. 1-3. According to the illustrated example of FIG. 4, the assembly 400 includes the sunshade tensioner 401, a first example sunroof drain (e.g., a rear drain) 402, and an example sunshade axle 404. The first sunroof drain 402 is configured to hold the sunshade axle 404 and/or the sunshade tensioner 401. As shown in FIG. 4, the first sunroof drain 402 is coupled between and/or interposed between at least a component of the sunroof 102 and the sunshade axle 404 and the sunshade tensioner 401 such as, for example, an example rail 408 of the sunroof 102. That is, according to the illustrated example of FIG. 4, the drain 402 is supported by the rail 408 and, thus, the sunshade axle 404 and/or the sunshade tensioner 401 is/are supported by the rail 408. In particular, the sunshade tensioner 401 is removably coupled to the first drain 402 such that one or more users (e.g., vehicle personnel, a vehicle owner, a driver, etc.) can remove the sunshade tensioner 401 from the first drain body 414 after the sunshade tensioner 401 is installed into the sunroof 102, as discussed in greater detail below in connection with FIGS. 5, 6, 7A, and 7B.

The sunroof rail 408 of FIG. 4 is coupled (e.g., directly and/or via one or more intermediate components) to the vehicle roof 202 such that the vehicle roof 202 provides support to the sunroof rail 408 and, thus, to the sunroof component(s) supported by and/or coupled to the sunroof rail 408. In particular, the sunroof rail 408 is configured to receive one or more example movable sunroof components associated with controlling movement of the panel(s) 204, 206 such as, for example, any of one or more panel brackets (e.g., bracket(s) coupled to and/or supporting the panel(s) 204, 206), one or more drive shoes, one or more drive links, etc. As shown in FIG. 4, the rail 408 forms and/or defines one or more examples guide channels 410 that extend at least partially along a length of the rail 408 between a first end 412 of the rail 408 and a second end of the rail 408 opposite the first end 412. In such examples, the movable sunroof component(s) are slidably disposed within the guide channel(s) 410, and the rail 408 guides movement of the component(s) via the guide channel(s) 410. For example, one or more of the components of the sunroof guide system 220 and/or one or more components of the sunroof actuator system 222 is/are positioned in the guide channel(s) 410.

The first drain 402 of FIG. 4 is structured and/or configured to convey one or more fluids (e.g., water) away from the sunroof 102, thereby preventing the fluid(s) from entering the vehicle cabin 108. That is, the first drain 402 prevents the sunroof 102 from leaking. In some examples, the first drain 402 includes a first example body 414 that forms and/or defines a first example fluid cavity 416 to catch the fluid(s). In particular, the first fluid cavity 416 is sized and/or shaped to receive the fluid(s) and drain the fluid(s) therefrom. In some examples, the rail 408 provides the fluid(s) to the first fluid cavity 416 of the first drain 402, for example, during certain weather events and/or weather conditions.

According to the illustrated example of FIG. 4, the sunshade axle 404 and the sunshade tensioner 401 are coupled (e.g., removably coupled) to the first body 414 and/or, more generally, to the first drain 402, for example, via one or more example fasteners and/or one or more example fastening methods or techniques. In some examples, to facilitate such coupling, the assembly 400 includes one or more example adaptors (e.g., one or more tabs) 418, 420 that are positioned on and/or couple to the first drain body 414, two of which are shown in this example (i.e., a first adaptor (e.g., a first tab) 418 and a second adaptor (e.g., a second tab) 420). In particular, the first adaptor 418 of FIG. 4 is coupled (e.g., removably coupled) to the sunshade axle 404 to support the sunshade axle 404. As such, the sunshade axle 404 is supported by the first adaptor 418 and/or, more generally, the first drain body 414 and/or the first drain 402. Further, the second adaptor 420 of FIG. 4 is coupled (e.g., removably coupled) to the sunshade tensioner 401 to support the sunshade tensioner 401. As such, the sunshade tensioner 401 is supported by the second adaptor 420 and/or, more generally, the first body 414 and/or the first drain 402.

In some examples, the first adaptor 418 is configured to couple the sunshade axle 404 to the first body 414 and/or decouple the sunshade axle 404 from the first body 414. In some such examples, the first adaptor 418 includes a first example aperture (e.g., a circular opening) 422 positioned thereon through which the sunshade axle 404 is to extend. That is, the first aperture 422 of FIG. 4 is sized and/or shaped to receive a first end 424 of the axle 404. As shown in FIG. 4, the sunshade axle 404 passes through the first aperture 422 and is engaging a surface (e.g., an inner surface) of the first adaptor 418 that forms and/or defines the first aperture 422. As such, the surface of the first adaptor 418 imparts a force or load on the sunshade axle 404, which maintains an orientation and/or a position of the axle 404 relative to the first drain 402. In this manner, the first adaptor 418 supports and/or carries the sunshade axle 404. In some examples, the sunshade axle 404 is rotatable relative to the first adaptor 418 while a position of the sunshade axle 404 relative to the first adaptor 418) is substantially maintained (i.e., the sunshade axle 404 and the first adaptor 418 are rotatably coupled together. That is, in such examples, a surface (e.g., an outer surface) of the axle 404 slidably engages the surface of the first adaptor 418 that forms and/or defines the first aperture 422. However, in some examples, the sunshade axle 404 is fixedly coupled the first adaptor 418 such that the sunshade axle 404 cannot rotate relative to the first adaptor 418.

In some examples, the second adaptor 420 facilitates coupling the sunshade tensioner 401 to the first body 414 and/or decoupling the sunshade tensioner 401 from the first body 414, as discussed further below in connection with FIG. 6. As shown in FIG. 4, the second adaptor 420 extends over the tensioner 401 such that the second adaptor 420 and the tensioner 401 at least partially overlap with each other.

The sunshade axle 404 of FIG. 4 is configured to carry and/or support an example sunshade (e.g., a fabric and/or a textile) 426 of the sunroof 102. As shown in FIG. 4, the sunshade 426 is wound on and/or otherwise positioned on the axle 404. In particular, the sunshade 426 is configured to unwind and/or wind relative to the axle 404, for example, in response to a user imparting a force (e.g., pulling and/or pushing) on an end of the sunshade 426. Additionally or alternatively, to unwind and/or wind the sunshade 426, the axle 404 is operatively coupled to the motor(s) 106 to receive the output therefrom. For example, the motor(s) 106 impart a force and/or a torque on the axle 404, thereby rotating the axle 404 and, thus, winding and/or unwinding the sunshade 426. In particular, when the sunshade 426 is in an extended position and/or otherwise positioned beneath the sunroof panel(s) 204, 206, the sunshade 426 absorbs, reflects, scatters, and/or otherwise blocks external light, which improves comfort of vehicle occupant(s) during certain vehicle lighting conditions.

To prevent the sunshade 426 from wrinkling and/or otherwise forming wrinkle(s), the sunshade tensioner 401 of FIG. 4 is configured to impart a force or pressure on and/or otherwise engage a portion or area (e.g., a bottommost area) 428 of the sunshade 426. The sunshade tensioner 401 of FIG. 4 includes and/or is otherwise at least partially constructed of one or more appropriate materials such as, for example plastic, metal, etc. As shown in FIG. 4, the sunshade tensioner 401 includes an oblong body 430 positioned near the sunshade axle 404, for example, such that the oblong body 430 and the sunshade axle 404 are substantially parallel relative to each other. In some examples, the tensioner 401 includes an outer surface formed by the oblong body 430 that extends along the sunshade 426 and is engaged with the area 428 of the sunshade 426. In such examples, as a result of the first drain 402 holding the tensioner 401 and the axle 404, the first drain 402 substantially maintains a position of the tensioner 401 relative to the axle 404 and/or an orientation of the tensioner 401 relative to the axle 404, which enables the tensioner 401 to substantially maintain such engagement with the sunshade 426. In this manner, the tensioner 401 provides tension to the sunshade 426 to substantially prevent the sunshade 426 from wrinkling, which may be desirable to vehicle occupant(s).

Additionally or alternatively, in some examples, the first drain 402 is configured to hold an example sunroof housing (e.g., a rear sunroof housing) associated with the sunroof 102. In such examples, to facilitate coupling the sunroof housing to the first body 414, the first drain 402 includes a third example adaptor (e.g., a third tab) 432 positioned on and/or coupled to the first body 414. In such examples, the third adaptor 432 includes one or more example protrusions (e.g., any of one or more pins, one or more bolts, one or more studs, etc.) 434 that are positioned on and/or coupled to the third adaptor 432 and extend away from the third adaptor 432, one of which is shown in this example. The protrusion(s) 434 are configured to receive at least a portion of the sunroof housing. In particular, when the sunroof housing is aligned to the protrusion(s) 434 and/or otherwise positioned on the third adaptor 432, the third adaptor 432 supports and/or carries at least a portion of the sunroof housing, and the protrusion(s) 434 maintains a position and/or an orientation of the sunroof housing relative to the drain 402. More generally, in such examples, the body 414 and/or the first drain 402 support and/or carry the sunroof housing.

In some examples, to improve strength and/or rigidity of the first body 414, the first drain 402 includes an example bracket (e.g., sheet metal) 436 that is coupled to the first body 414, for example, via one or more molding methods or techniques (e.g., injection molding). For example, the first body 414 can be overmolded with the bracket 436. In such examples, after the bracket 436 is produced, the bracket 436 is placed in a mold. Then, a first example material (e.g., plastic) is heated and/or injected into the mold with the bracket 436 to substantially form the first body 414. In this manner, disclosed examples couple the first body 414 and the bracket 436 together (e.g., after the first material sufficiently cools). Thus, in some examples, the first body 414 includes and/or is otherwise at least partially constructed of the first material.

Further, at least a portion (e.g., one or more sheets or one or more sheet portions) of the drain bracket 436 of FIG. 4 is positioned within the first drain body 414, as represented by the dotted/dashed lines of FIG. 4. However, in some examples, the drain bracket 436 is positioned on and/or coupled to an outer or exterior surface of the first drain body 414 (i.e., the bracket 436 is not positioned within the first drain body 414).

In some examples, the bracket 436 includes and/or is otherwise at least partially constructed of a second material (e.g., a metal such as steel) that is different from the first material. In particular, the second material is stronger and/or more rigid compared to the first material. However, the first material is less dense compared to the second material. As a result, such a combination of the first and second materials reduces weight of the first drain 402 while enabling the first drain 402 to sufficiently hold one or more (e.g., all) of the axle 404, the tensioner 401, and/or the sunroof housing. Thus, the bracket 436 enables and/or improves such holding functionality associated with the first drain 402.

In some examples, the bracket 436 is produced via one or more example sheet metal forming methods or techniques such as, for example, one or more of bending, flanging, cutting, punching, etc. In particular, in such examples, the bracket 436 is shaped such that the bracket 436 forms and/or defines one or more (e.g., all) of the first adaptor 418, the second adaptor 420, and/or the third adaptor 432, as shown in FIG. 4. That is, in such examples, the bracket 436 and/or at least a portion thereof is curved and/or angled such as, for example, the first portion 514 of FIG. 5. As such, the bracket 436 of FIG. 4 is configured to hold one or more (e.g., all) of the sunshade axle 404, the sunshade tensioner 401, and/or the sunroof housing.

Figure 5:
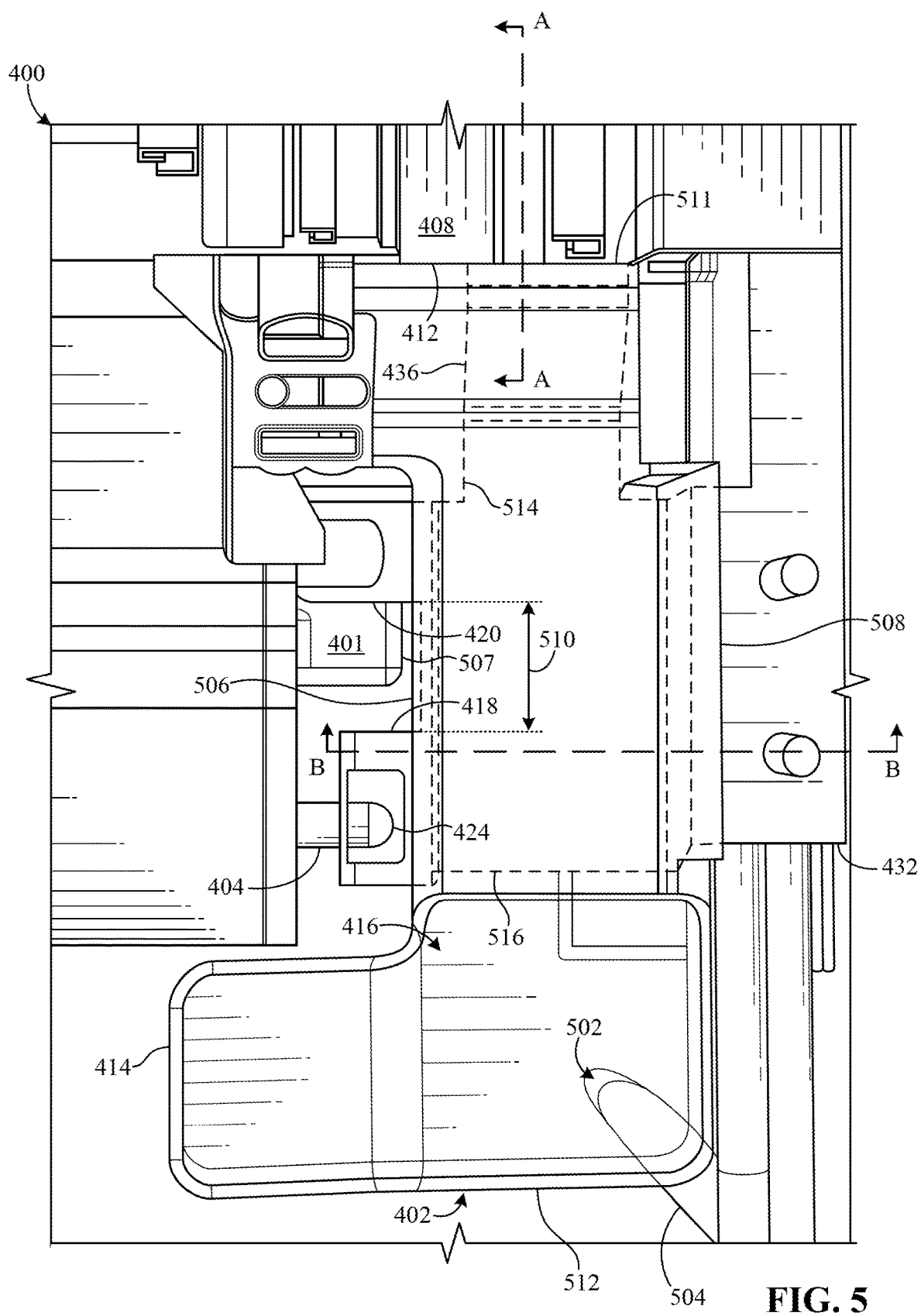
FIG. 5 is a top-view of the example assembly of FIG. 4.

FIG. 5 is a top-view of the assembly 400 and shows the first sunroof drain 402. According to the illustrated example of FIG. 5, the first drain 402 includes an example outlet 502 that is positioned on the first body 414 and in fluid communication with the first fluid cavity 416. In other words, the outlet 502 is fluidly coupled to the fluid cavity 416. In some examples, the outlet 502 includes a recessed area and/or an aperture defined by the first body 414. In particular, the outlet 502 of FIG. 5 is configured to drain the fluid(s) from the first fluid cavity 416 when the fluid(s) are in the first fluid cavity 416.

Additionally, in some examples, the first drain 402 includes an example fluid line (e.g., a tube, a pine, a channel, etc.) 504 that is fluidly coupled to the outlet 502 and configured to receive the fluid(s) from the outlet 502, which facilitates flowing the fluid(s) away the sunroof 102 and/or away from an interior of the vehicle 100. For example, the fluid line 504 extends through and/or along at least a portion of the vehicle 100 (e.g., a pillar) from the fluid cavity 416 to an exterior of the vehicle 100. In particular, the fluid line 504 conveys the fluid(s) therethrough and expels the fluid(s) via an outlet of the fluid line 504.

In some examples, the first adaptor 418 and/or the second adaptor 420 are positioned on and/or project from a first side 506 of the first body 414 near the first fluid cavity 416, as shown in FIG. 5. That is, the first adaptor 418 extends away from the first side 506 of the first body 414 to support the first end 424 of the sunroof axle 404. Further, the second adaptor 420 extends away from the first side 506 of the first body 414 to support a first end 507 of the body 430 of the sunshade tensioner 401. Additionally, in some examples, the third adaptor 432 of FIG. 5 is positioned on and/or projects from a second side 508 of the first body 414, opposite the first side 506, near the first fluid cavity 416. That is, the third adaptor 432 extends away from the second side 508 of the body 414 to support the sunroof housing. Further, in some examples, the first adaptor 418 and the second adaptor 420 are spaced from each other by an example distance 510. Although FIGS. 4 and 5 depict the first adaptor 418 and the second adaptor 420 as separate adaptors, in some examples, the first adaptor 418 and the second adaptor 420 form a single or integral adaptor (e.g., a single tab). Further, in some such examples, the distance 510 between the first and second adaptors 418, 420 is substantially zero such that the first and second adaptors 418, 420 are proximate to and/or contacting each other.

As shown in FIG. 5, the first drain body 414 extends along (e.g., over and/or under) the bracket 436 and away from sunroof rail 408, for example, from a first end 511 of the first drain body 414 to a second end 512 of the first drain body 414 opposite the first end 511. As shown in FIG. 5, the first end 511 of the first drain body 414 is contacting and/or positioned proximate to the first end 412 of the rail 408. In particular, in such examples, the bracket 436 includes the aforementioned first example portion (e.g., a sheet or a sheet portion) 514 that at least partially overlaps with the first drain body 414, as represented by the dotted/dashed lines of FIG. 5. The first portion 514 of the bracket 436 of FIG. 5 defines a first end 516 of the bracket 436. In some examples, the bracket 436 extends away from the first drain body 414 along at least a portion of the rail 408, which facilitates coupling the bracket 436 and the rail 408 together via one or more example processes related to clinching and/or pressforming. As such, in some examples, the drain bracket 436 couples the first drain body 414 to the sunroof rail 408, as shown in FIG. 5.

Although FIGS. 4 and 5 depict the bracket 436 defining and/or otherwise including the first adaptor 418, the second adaptor 420, the third adaptor 432, and the first portion 514, in some examples, the bracket 436 is implemented differently. In some examples, the bracket 436 is implemented using only one of the first adaptor 418, the second adaptor 420, the third adaptor 432, the first portion 514, or a combination thereof.

Figure 6:
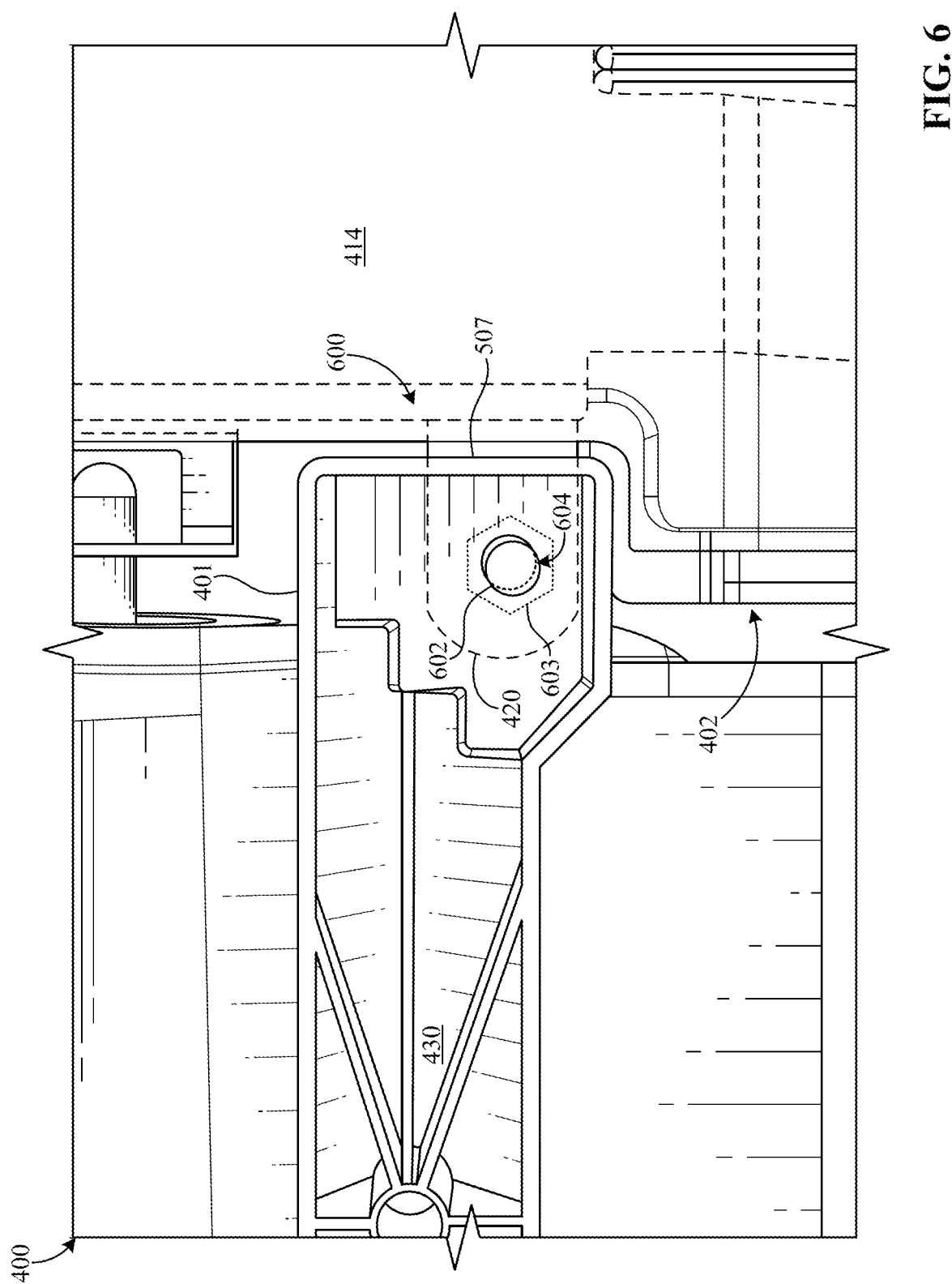
FIG. 6 is a bottom-view of the example assembly of FIG. 4 and shows an example fastening mechanism in accordance with the teachings of this disclosure.

FIG. 6 is bottom-view of the assembly 400 and shows a first example fastening mechanism 600 in accordance with the teachings of this disclosure. That is, in such examples, the sunroof assembly and/or, more generally, the sunroof 102 include the first fastening mechanism 600. In particular, the first fastening mechanism 600 of FIG. 6 is structured and/or configured to removably couple the first end 507 associated with the tensioner 401 to the first body 414 of the first drain 402, for example, in response to a user interacting with the first fastening mechanism 600. Stated differently, the first fastening mechanism 600 is structured and/or configured to couple the first end 507 to the first drain 402 and decouple the first end 507 from the first drain 402.

The first fastening mechanism 600 of FIG. 6 includes a first example fastener (e.g., a bolt, a stud, a rivet, a screw, etc.) 602 and a second example fastener (e.g., a threaded nut) 603, which is represented by the dotted/dashed lines of FIG. 6. According to the illustrated example of FIG. 6, the tensioner 401 includes a second example aperture (e.g., a circular opening) 604 positioned thereon at or near the first end 507 of the tensioner body 430. That is, the second aperture 604 is positioned on the tensioner body 430. The second aperture 604 of FIG. 6 is sized and/or shaped to receive the fastener 602.

According to the illustrated example of FIG. 6, the first fastening mechanism 600 includes and/or is formed by one or more (e.g., all) of the second adaptor 420, the first fastener 602, the second fastener 603, and the second aperture 604. The second adaptor 420 is supported by a component of the sunroof 102 such as, for example, the first drain 402, as previously mentioned. Although FIG. 6 depicts the second adaptor 420 supported by the first drain 402, in some examples, the second adaptor 420 is similarly positioned on, coupled to, and/or otherwise supported by one or more other components of the sunroof 102 in addition or alternatively to the first drain 402.

The first fastener 602 of FIG. 6 is coupled to the first body 414 of the first drain 402 via the second adaptor 420. Further, the second fastener 603 of FIG. 6 is adjustably coupled to the first fastener 602. In particular, the second fastener 603 moves along a length of the first fastener 602 when the second fastener 603 rotates relative to the first fastener 602. In this manner, the user(s) can interact with (e.g., tighten) the second fastener 603 to sufficiently secure the first end 507 associated with the tensioner 401, for example, via a tool (e.g., one of a wrench, a ratchet, etc.). For example, the user(s) rotate the second fastener 603 relative to the first fastener 602 until the second fastener 603 engages a surface of the tensioner body 430 whereby the tensioner body 430 is clamped and/or squeezed by the second fastener 603 and the second adaptor 420. Conversely, the user(s) can interact with (e.g., loosen) the second fastener 603, which allows the user(s) to then disconnect the first end 507 associated with the tensioner 401 from the second adaptor 420.

In some examples, to assemble the tensioner 401 and the first drain 402 via the first fastening mechanism 600, a portion of the tensioner 401 near the first end 507 is first aligned to a surface of the second adaptor 420. Then, the first fastener 602 is inserted to and/or otherwise positioned in the second aperture 604 such that the fastener 602 extends through the second aperture 604 (i.e., through the tensioner 401) and at least partially into the second adaptor 420, which removably couples the tensioner 401 to the second adaptor 420 and/or first drain body 414. As a result, the first drain body 414 provides support to and/or secures the first end 507 of the tensioner body 430. Further, in some such examples, the second fastener 603 is then positioned on an end of the first fastener 602 such that the second fastener 603 is coupled to the first fastener 602 and engaging a surface of the tensioner body 430.

Conversely, in some examples, to dissemble the tensioner 401 and the first drain 402 via the first fastening mechanism 600, the second fastener 603 is first removed and/or decoupled from the first fastener 602. Then, the first end 507 associated with the tensioner 401 is moved away from the second adaptor 420 and/or the first fastener 602 such that the fastener 602 exits the second aperture 604. Although FIGS. 4-6 depict aspects in connection with the first sunroof drain 402, in some examples, such aspects likewise apply to one or more other sunroof drains such as, for example, the second sunroof drain 702 of FIG. 7A, as discussed further below in connection with FIG. 7A.

In some examples, the tensioner body 430 includes a first example surface (e.g., an inner surface) that forms and/or defines the second aperture 604. In particular, in some such examples, the first fastener 602 and/or the second fastener 603 are configured to engage the first surface to substantially maintain a position and/or an orientation of the first end 507 associated with the tensioner 401 relative to the second adaptor 420.

FIG. 7A is an enlarged partial-view of the aforementioned second sunroof drain 702 and shows a second example fastening mechanism 700 in accordance with the teachings of this disclosure. That is, in some examples, the sunroof assembly 400 includes the second sunroof drain 702, which is configured to convey the fluid(s) away from the vehicle sunroof 102 in addition or alternatively to the first drain 402. The second sunroof drain 702 of FIG. 7A may be substantially similar relative to the first drain 402. Further, in such examples, the sunroof assembly 400 and/or, more generally, the sunroof 102 include the second fastening mechanism 700. The second sunroof drain 702 of FIG. 7A is spaced from the first sunroof drain 402 and configured to hold one or more of the sunshade axle 404, the sunshade tensioner 401, and/or the sunroof housing (e.g., cooperatively with the first sunroof drain 402). In some examples, the second drain 702 includes a second example body 704 that forms and/or defines a second example fluid cavity (not shown), which further facilitates conveying the fluid(s) away from the vehicle sunroof 102. In some examples, the second sunroof drain 702 is coupled between and/or interposed between at least a support component (e.g., a sunroof rail) of the sunroof 102 and the sunshade axle 404 and the sunshade tensioner 401 such that the support component supports the second drain 702 and the component(s) held by the second drain 702. In particular, the second fastening mechanism 700 of FIG. 7A is structured and/or configured to removably couple a second end 706 of the tensioner body 430, opposite the first end 507, to the second body 704 of the second drain 702, for example, in response to a user interacting with the second fastening mechanism 700. Stated differently, the second fastening mechanism 700 is structured and/or configured to couple the second end 706 to the second drain 702 and decouple the second end 706 from the second drain 702.

In some examples, to facilitate coupling the sunshade axle 404 and/or the sunshade tensioner 401 to the second body 704, the assembly 400 includes one or more example adaptors (e.g., one or more tabs) 708, 710 that are positioned on and/or coupled to the second drain body 704, two of which are shown in this example (i.e., a fourth adaptor (e.g., a fourth tab) 708 and a fifth adaptor (e.g., a fifth tab) 710). In particular, the fourth adaptor 708 of FIG. 7A is coupled (e.g., removably coupled) to the sunshade axle 404 to support the sunshade axle 404. As such, the sunshade axle 404 of FIG. 7A is supported by the fourth adaptor 708 and/or, more generally, the second drain body 704 and/or the second drain 702. Further, the fifth adaptor 710 of FIG. 7A is coupled (e.g., removably coupled) to the sunshade tensioner 401 to support the sunshade tensioner 401. As such, the sunshade tensioner 401 is supported by the fifth adaptor 710 and/or, more generally, the second body 704 and/or the second drain 702.

As such, in some examples, the sunshade axle 404 is coupled (e.g., removably coupled) between and/or interposed between the first adaptor 418 and the fourth adaptor 708, which provides better support to the sunshade axle 404 compared to a single adaptor 418, 708. However, in some examples, the sunshade axle 404 is coupled to the first adaptor 418 or the fourth adaptor 708.

In some examples, the fourth adaptor 708 is configured to couple the sunshade axle 404 to the second body 704 and/or decouple the sunshade axle 404 from the second body 704. In such examples, the fourth adaptor 708 forms and/or defines a third example aperture (e.g., a circular opening) 712 through which the sunshade axle 404 is to extend. That is, the third aperture 712 of FIG. 7A is sized and/or shaped to receive a second end 714 of the axle 404 opposite the first end 424 of the axle 404. As such, in some examples, the axle 404 extends from the first adaptor 418 to the fourth adaptor 708 from the first end 424 to the second end 714. As shown in FIG. 7A, the sunshade axle 404 passes through the third aperture 712 and is engaging a surface (e.g., an inner surface) of the fourth adaptor 708 that forms and/or defines the third aperture 712. In this manner, the fourth adaptor 708 supports and/or carries the sunshade axle 404. In some examples, the sunshade axle 404 is rotatable relative to the fourth adaptor 708 while substantially maintaining an orientation and/or a position of the sunshade axle 404 relative to the fourth adaptor 708 (e.g., the sunshade axle 404 and the fourth adaptor 708 are rotatably coupled together). However, in some examples, the sunshade axle 404 is fixedly coupled the fourth adaptor 708 such that the sunshade axle 404 cannot rotate relative to the fourth adaptor 708.

As shown in FIG. 7A, the fifth adaptor 710 extends away from second drain body 704 and through the tensioner 401 to support the second end 706 associated with the tensioner 401. In such examples, the tensioner 401 includes a fourth example aperture (e.g., a slot) 718 that is positioned thereon at or near the second end 706 and sized, shaped, and/or otherwise configured to receive the fifth adaptor 710. That is, the fourth aperture 718 is positioned on the tensioner body 430. In particular, the fifth adaptor 710 is configured to extend through the fourth aperture 718 to removably couple the second end 706 of the tensioner body 430 to the second drain 702.

According to the illustrated example of FIG. 7A, the second fastening mechanism 700 includes and/or is formed by the fifth adaptor 710 and the fourth aperture 718. The fifth adaptor 710 is coupled to and/or supported by a component of the sunroof 102 such as, for example, the second drain 702. Although FIG. 7A depicts the fifth adaptor 710 supported by the second drain 702, in some examples, the fifth adaptor 710 is similarly positioned on, coupled to, and/or otherwise supported by one or more other components of the sunroof 102 in addition or alternatively to the second drain 702.

In some examples, the body 430 of the tensioner 401 includes a second example surface (e.g., an inner surface) 720 (FIG. 7B) that forms and/or defines the fourth aperture 718. In particular, the second surface 720 is sized, shaped, and/or otherwise configured to engage a surface (e.g., an outer surface) 722 of the fifth adaptor 710 to maintain a position and/or an orientation of the second end 706 of the tensioner body 430 relative to the second drain 702. That is, in such examples, the second surface 720 of the tensioner body 430 engages and/or squeezes the surface 722 of the fifth adaptor 710 when the fifth adaptor 710 is inserted into and/or positioned in the fourth aperture 718. In some examples, the second surface 720 of the tensioner 401 and the surface 722 of the fifth adaptor 710 are sized and/or shaped to conform to each other. For example, the second surface 720 has a contour that substantially matches and/or is the same relative to a contour of the adaptor surface 722. Additionally, in some examples, the fifth adaptor 718 is tapered such that a cross-sectional area of the fifth adaptor 718 varies along thereacross. On the other hand, in some examples, the fifth adaptor 718 has a length or width and a thickness that is substantially uniform across the length or width.

In some examples, to assemble the tensioner 401 and the second drain 702 via the second fastening mechanism 700, the fourth aperture 718 is first aligned to the fifth adaptor 710. Then, the fifth adaptor 710 is inserted to and/or otherwise positioned in the fourth aperture 718 such that the fifth adaptor 710 extends through the fourth aperture 718 (i.e., through the tensioner 401), which removably couples the tensioner 401 to the fifth adaptor 710 and/or the second drain body 704. Additionally, in examples where the assembly 400 includes the first fastening mechanism 600, the fifth adaptor 710 is positioned in the fourth aperture 718 before the first fastener 602 is positioned in the second aperture 604.

Conversely, in some examples, to dissemble the tensioner 401 and the second drain 702 via the second fastening mechanism 700, the second end 706 of the tensioner 401 is urged or moved away from the fifth adaptor 710 such that the fifth adaptor 710 slides out of and/or otherwise exits the fourth aperture 718. Additionally, in examples where the assembly 400 includes the first fastening mechanism 600, the first end 507 of the tensioner 401 is first moved away from the second adaptor 420 such that the first fastener 602 slides out of and/or exits the second aperture 604, which then allows the second end 706 of the tensioner 401 to move away from the fifth adaptor 710. That is, in some such examples, the first fastening mechanism 600 prevents the second fastening mechanism 700 from disconnecting the tensioner 401 from the second drain 402 (e.g., when the second fastener 603 is coupled to the first fastener 602).

In some examples, the first fastener 602 is configured to engage the first surface of the tensioner body 430 that forms and/or defines the second aperture 604 to prevent the fifth adaptor 710 from exiting the fourth aperture 718. Further, in some examples (e.g., when the second fastener 603 is removed from the first fastener 602), the first end 507 of the tensioner 401 is movable relative to the first fastener 602 while the fifth adaptor 710 remains in the fourth aperture 718 such that the tensioner body 430 pivots relative to the fifth adaptor 710, which allows the user(s) to disconnect the first end 507 of the tensioner 401 from the second adaptor 420. For example, in response to a force imparted on the first end 507, the first end 507 moves slightly in a vertical direction relative to the first fastener 602.

As such, in some examples, the sunshade tensioner 401 is coupled (e.g., removably coupled) between and/or interposed between the second adaptor 420 and the fifth adaptor 710, which provides better support to the sunshade tensioner 401 compared to a single adaptor 420, 710. That is, the tensioner 401 and/or the body 430 thereof extend between the second adaptor 420 and the fifth adaptor 710 from the first end 507 to the second end 706. Additionally, in some examples, to improve strength and/or rigidity of the second body 704, the second drain 702 includes an example bracket (e.g., sheet metal) that is coupled to the second body 704, similar to the bracket 436 of the first drain 402. In particular, in such examples, the bracket of the second drain 702 is shaped such that the bracket forms and/or defines one or more of the fourth adaptor 708 and/or the fifth adaptor 710.

Although FIGS. 4-7A depict the sunshade tensioner 401 removably coupled to the first drain 402 and/or the second drain 702, in some examples, the sunshade tensioner 401 is similarly coupled to one or more other components of the sunroof 102. In some examples, the sunshade tensioner 401 is removably coupled to the first sunroof rail 408 and/or a second sunroof rail spaced from the first sunroof rail 408.

FIG. 7B is an enlarged portion view of the sunshade tensioner 401 and shows the fourth aperture 718 thereof. According to the illustrated example of FIG. 7B, the fourth aperture 718 includes a slot. That is, the fourth aperture 718 has a shape that is oblong such as, for example, one of a rectangle (e.g., a rounded rectangle), an oval, etc. Although FIG. 7B depicts the fourth aperture 718 as rectangular, in some examples, the fourth aperture 718 is sized and/or shaped differently.

As used herein, the terms "Including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended. Further, when used in connection with multiple elements, the term "and/or" refers to any combination of the elements. For example, the form A, B, and/or C refers to any of: (1) A alone; (2) B alone; (3) C alone; (4) A and B; (5) A and C; (6) B and C; or (7) A, B, and C.

It will be appreciated that the systems, apparatus, and methods disclosed in the foregoing description provide numerous advantages. Examples disclosed herein provide sunshade tensioners that are configured to couple to and decouple from a vehicle sunroof such that a user can easily remove a sunshade tensioner after the sunshade tensioner is installed into the vehicle sunroof, which reduces time and/or costs typically associated with servicing and/or maintaining vehicle sunroofs. Some examples provide sunroof drains that are configured to hold a disclosed sunshade tensioner and/or one or more other sunroof components, which reduces time and/or costs typically associated with assembling and/or fastening such sunroof component(s).

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An assembly for a vehicle sunroof, comprising:
   a sunshade tensioner defining a body configured to engage a sunshade of the vehicle sunroof to prevent the sunshade from wrinkling, the body including a first end and a second end opposite to the first end; and
   a tab supported by a component of the vehicle sunroof, the tab configured to extend through a second-end aperture positioned on the second end of the body to removably couple the second end of the body to the component.

2. The assembly of claim 1, wherein the second-end aperture includes a slot.

3. The assembly of claim 1, wherein the body includes an inner surface that forms the second-end aperture and is configured to engage an outer surface of the tab to maintain a position of the second end relative to the component.

4. The assembly of claim 1, further comprising:
   a fastener supported by an other component of the vehicle sunroof, the fastener configured to extend through a first-end aperture positioned on the first end of the body to removably couple the first end of the body to the other component.

5. The assembly of claim 4, wherein the first end of the body is movable relative to the fastener while the tab remains in the second-end aperture such that the body pivots relative to the tab.

6. The assembly of claim 4, wherein the fastener is configured to engage the sunshade tensioner to prevent the tab from exiting the second-end aperture.

7. A vehicle sunroof, comprising:
   a first sunroof drain configured to convey a fluid away from the vehicle sunroof;
   a sunshade tensioner configured to impart a pressure on a sunshade; and
   a first fastening mechanism configured to couple a first end associated with the sunshade tensioner to the first sunroof drain and decouple the first end from the first sunroof drain.

8. The vehicle sunroof of claim 7, wherein the first fastening mechanism includes a first fastener coupled to the first sunroof drain, and wherein the sunshade tensioner includes an aperture positioned thereon at or near the first end and configured to receive the first fastener.

9. The vehicle sunroof of claim 7, further including:
a second sunroof drain spaced from the first sunroof drain and configured to convey the fluid away from the vehicle sunroof; and
a second fastening mechanism configured to couple a second end associated with the sunshade tensioner, opposite the first end, to the second sunroof drain and decouple the second end from the second sunroof drain.

10. The vehicle sunroof of claim 9, wherein the second fastening mechanism includes a tab coupled to the second sunroof drain, and wherein the sunshade tensioner includes an aperture positioned thereon at or near the second end and configured to receive the tab.

11. The vehicle sunroof of claim 10, wherein sunshade tensioner defines a body extending between the first sunroof drain and the second sunroof drain.

12. The vehicle sunroof of claim 10, wherein the second fastening mechanism includes a second fastener configured to couple to the first fastener and engage the sunshade tensioner.

* * * * *